United States Patent
Keem

(10) Patent No.: US 7,195,661 B2
(45) Date of Patent: *Mar. 27, 2007

(54) MAGNETIC MATERIAL

(75) Inventor: John Keem, Bloomfield Hills, MI (US)

(73) Assignee: Pioneer Metals and Technology, Inc., Boston, MA (US)

(*) Notice: Subject to any disclaimer, the term of this patent is extended or adjusted under 35 U.S.C. 154(b) by 117 days.

This patent is subject to a terminal disclaimer.

(21) Appl. No.: 10/374,830

(22) Filed: Feb. 24, 2003

(65) Prior Publication Data

US 2003/0221749 A1 Dec. 4, 2003

Related U.S. Application Data

(63) Continuation-in-part of application No. 09/263,347, filed on Mar. 5, 1999, now Pat. No. 6,524,399.

(51) Int. Cl.
*H01F 1/057* (2006.01)

(52) U.S. Cl. .................. 75/349; 148/101; 164/122

(58) Field of Classification Search ............. 148/101, 148/105, 302; 75/348, 349; 164/122, 462, 164/463
See application file for complete search history.

(56) References Cited

U.S. PATENT DOCUMENTS

| | | |
|---|---|---|
| 4,374,665 A | 2/1983 | Koon |
| 4,402,770 A | 9/1983 | Koon |
| 4,409,043 A | 10/1983 | Koon |
| 4,533,408 A | 8/1985 | Koon |
| 4,715,891 A | 12/1987 | Ovshinsky et al. |
| 4,753,675 A | 6/1988 | Ovshinsky et al. |
| 4,770,723 A | 9/1988 | Sagawa et al. |
| 4,792,368 A | 12/1988 | Sagawa et al. |
| 4,802,931 A | 2/1989 | Croat |
| 4,851,058 A | 7/1989 | Croat |
| 4,867,785 A | 9/1989 | Keem et al. |
| 4,935,074 A | 6/1990 | De Mooij et al. |
| 4,994,109 A | 2/1991 | Willman et al. |
| 5,071,493 A | 12/1991 | Mizoguchi et al. |
| 5,116,434 A | 5/1992 | Keem et al. |

(Continued)

FOREIGN PATENT DOCUMENTS

EP 0542529 5/1993

(Continued)

OTHER PUBLICATIONS

Kanekiyo, H. and Hirosawa, S., "Thick $Fe_3B/Nd_2Fe_{14}B$ nanocomposite permanent magnet flakes prepared by slow quenching," Journal of Applied Physics, Jun. 1998.

*Primary Examiner*—George Wyszomierski
(74) *Attorney, Agent, or Firm*—Boston IP Law Group; Rajesh Vallabh

(57) ABSTRACT

Magnetic materials having a coercivity not less than about 1000 Oersted are prepared in a single step procedure. A molten mixture of a desired composition having a relatively high boron content is cooled at a rate slower than about $10^5$ degrees Celsius per second. Preferably, the molten mixture is cooled by depositing it on a chilled surface such that it forms a layer between about 120 and about 300, and preferably between about 120 and about 150, microns thick.

73 Claims, 2 Drawing Sheets

U.S. PATENT DOCUMENTS

Figure 1:
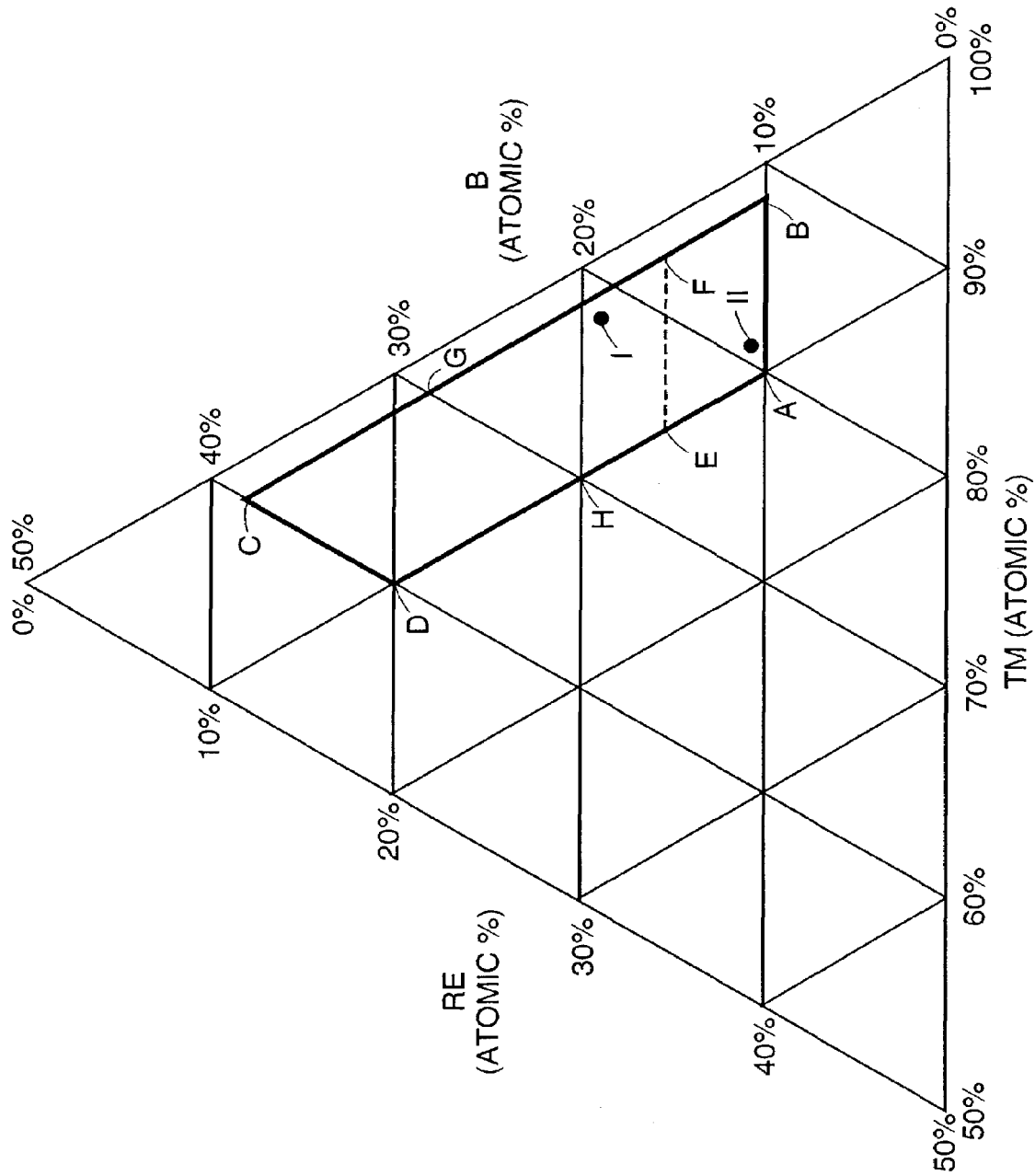

| | | | |
|---|---|---|---|
| 5,597,425 A | 1/1997 | Akioka et al. | |
| 5,815,718 A | 9/1998 | Tock | |
| 6,019,859 A | 2/2000 | Kanekiyo et al. | |
| 6,022,424 A | 2/2000 | Sellers et al. | |
| 6,478,889 B2 | 11/2002 | Kanekiyo | |
| 6,524,399 B1 * | 2/2003 | Keem | 148/105 |

FOREIGN PATENT DOCUMENTS

| | | |
|---|---|---|
| EP | 0959478 | 11/1999 |
| JP | 01 171209 | 7/1989 |
| JP | 01171209 | 7/1989 |
| JP | 08 264363 | 10/1996 |
| JP | 08264363 | 10/1996 |
| WO | 9835364 | 8/1998 |
| WO | WO-02/067275 A1 | 8/2002 |

* cited by examiner

MAGNETIC MATERIAL

RELATED APPLICATION

The present application is a continuation-in-part of application Ser. No. 09/263,347 filed on Mar. 5, 1999 for "Magnetic Material" to be issued as U.S. Pat. No. 6,524,399 on Feb. 25, 2003.

FIELD OF THE INVENTION

This invention relates to permanent magnetic materials of RE-TM-B alloys, and, more particularly, to methods of producing alloyed Nd/Pr—Fe—B alloyed powders.

BACKGROUND OF THE INVENTION

This invention relates to magnetic materials comprising one or more transition metals, one or more rare earth elements and iron. A variety of such materials are known. See, for example, U.S. Pat. Nos. 4,374,665, 4,402,770, 4,409,043 and 4,533,408 of Koon, which disclose magnetic alloys comprising iron, lanthanum and a lanthanide, and boron; U.S. Pat. Nos. 4,802,931 and 4,851,058 to Croat, which disclose single phase TM-RE-B alloys, U.S. Pat. No. 4,935,074 of DeMooij et al., which discloses a material including iron, a relatively high percentage of boron, and Nd and/or Pr; U.S. Pat. No. 5,071,493 to Mizogochi et al., and U.S. Pat. No. 4,770,723 to Sgawa et al. Methods of preparing such magnetic materials are taught in U.S. Pat. Nos. 4,867,785 and 5,116,434 to Keem et al., U.S. Pat. Nos. 4,715,891 and 4,753,675 to Ovshinsky et al., U.S. Pat. No. 6,019,859 to Kanekiyo et al. and in a Journal of Applied Physics article by Kanekiyo et al., J. Appl. Phys. 83, pg 6265, (1998).

In general, the magnetic material is prepared in two-steps. The first step is to prepare a substantially homogeneous master alloy of the desired composition of the various components, and then to break the alloy into relatively large, e.g., 1 cm pieces, that can be easily remelted for later processing. The second step is to remelt the alloy in a crucible, and then to quench and rapidly solidify (e.g., 25–30 micron and not over 50 microns thick) homogeneous ribbon. Typically the quenching and rapid solidification is accomplished by passing the melted material through a small (e.g., 1 mm in diameter) orifice onto a moving chill surface, e.g., a rotating chill surface such as that shown in aforementioned U.S. Pat. No. 4,867,785.

Typically, the ribbon is then crushed into fine powder, the powder is then heat treated and magnetically separated (e.g., as disclosed in U.S. Pat. No. 5,116,434) to separate powder having high magnetic parameters from that having lower magnetic parameters, and the high magnetic parameter powder is made into permanent magnets.

The above described procedures, and particularly the quenching and rapid solidification, are expensive and subject to a number of potential problems and difficulties. For example, unsatisfactory product may result from variations in the flow from the crucible caused by alloy/crucible reaction products, slag or products of reaction between the atmosphere and the molten alloy at the crucible orifice that can clog or impede flow through the small crucible orifice, or for relatively small variations in the chill surface temperature or surface speed that affect the quench rate and/or ribbon thickness resulting in unacceptable products.

There has been, and remains, a need for a process that is less expensive and has fewer difficult-to-control parameters.

SUMMARY OF THE INVENTION

According to the present invention, a class of alloyed magnetic materials, i.e., materials having a relatively high boron content, are prepared in a single step procedure. A molten mixture of the desired composition is cooled at a rate slower that about $10^5$ degrees Celsius per second and preferably more than about $10^4$ degrees Celsius per second such that the material is not fully crystallized. Without the need for conventional rapid quenching, a powder of the slow-cooled material may then be heat treated and, optionally, magnetically separated. Surprisingly, such slow cooled material has been found to have magnetic properties superior to those of material of identical composition made in the conventional two-step, rapid quenching procedure.

In some preferred practices of the invention, the molten mixture is solidified by depositing it on a heat conducting surface at near atmospheric pressures and by pouring though an orifice greater than about 1.5 mm in diameter such that it forms a layer between about 120 and about 300, and preferably between about 120 and about 150, microns thick, and the relatively thick layer of slow-cooled material is then crushed into powder before heat treating. In these and other preferred practices of the invention, the molten mixture contains more than about 10 (and most preferably not less than about 20) atomic percent boron and not more than about 10 atomic percent of a rare earth. Preferably at least 90 percent by weight of the rare earth content is Nd, Pr or a mixture thereof and any other rare earth constitute less than 10 percent of the total rare earth content. In most preferred practices, the molten mixture includes at least 60 atomic percent, and preferably at least 70 atomic percent, Fe.

Figure 2:
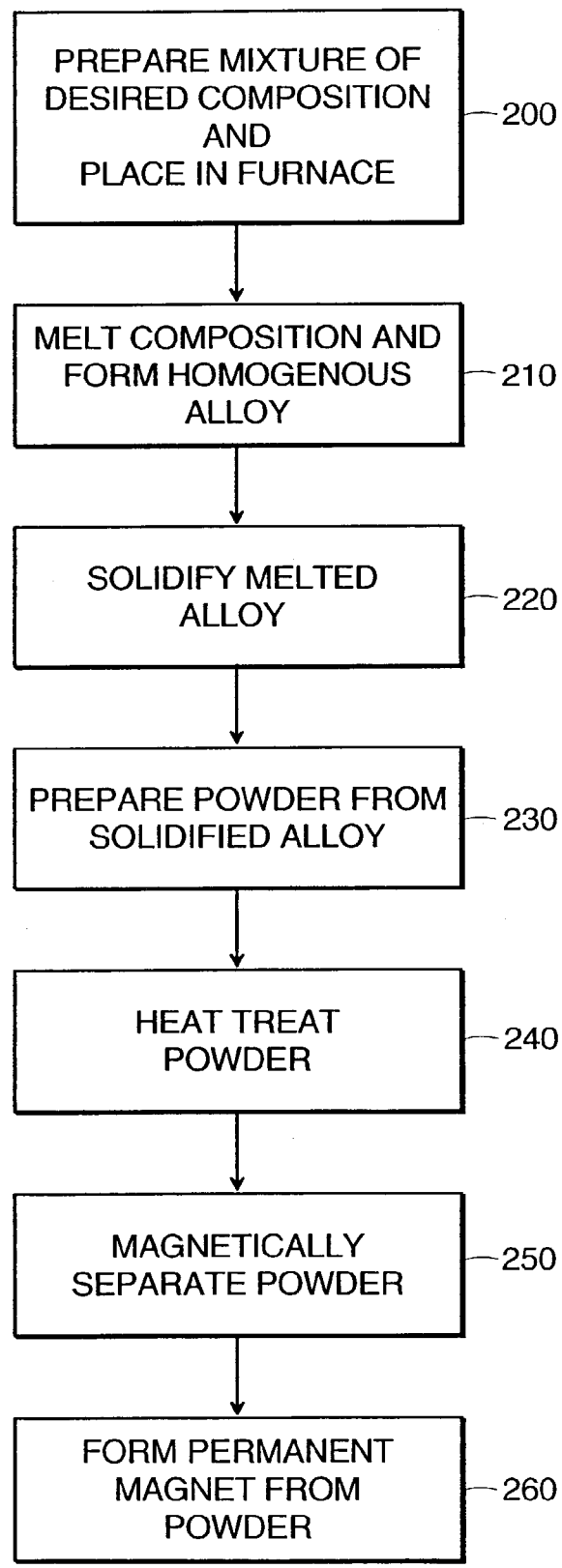

The above, and other objects, features and advantages of the invention will appear from the following detailed description, taken in conjunction with the attached drawings in which:

FIG. 1 is a partial tertiary phase diagram illustrating the compositional make-up of the permanent magnet material of the present invention; and FIG. 2 is a flow chart schematically illustrating the procedure of the present invention.

DETAILED DESCRIPTION

Permanent magnet materials made according to the present invention include (a) one or more transition metals, (b) one or more rare earth metals, and (c) boron. They may also include relatively small amounts of one or more auxiliary glass formers such as silicon or aluminum.

Boron comprises between about 10 atomic percent and about 30 atomic percent, and preferably not less than about 20 atomic percent, of the material. The rare earth (RE) component is neodymium, praseodymium or a mixture of the two, preferably neodymium, and comprises between about 3 atomic percent and about 10 atomic percent of the material; up to about 10 percent of the total rare earth content of the alloy may be other rare earths. The transition metal (TM) typically is iron, cobalt, or a mixture thereof, preferably iron, and may include relatively minor amounts of one or more of titanium, vanadium, zirconium, niobium, molybdenum, hafnium, chromium or nickel. Except for minor amounts of a glass former such as silicon or aluminum, the transition metal component comprises the balance, not less than about 60 atomic percent, and preferably not less than about 70 atomic percent, of the material.

The relative amounts of the various components are interdependent, as shown in the partial ternary phase diagram of FIG. 1. Specifically, the points designated as A, B, C and D in FIG. 1 define a region of the phrase diagram, in the general shape of a parallelepiped, the boundaries of which define the compositional range of permanent magnet materials made according to the present invention. It will be noted that the materials have a minimum boron content of about 10 atomic percent, and a maximum RE content of about 10 atomic percent. The preferred compositional range is the generally trapezoidal region defined by the points designated as E, F, G and H. Materials within this preferred compositional range have a minimum boron content of about 15 atomic percent and a minimum TM content of about 70 atomic percent.

As shown in FIG. 2, the first step in producing the magnetic material according to the present invention is to place the TM, RE and B components of the material in a ceramic-lined crucible which is in turn placed in a vacuum-induction furnace. (Step 200) The crucible and its contents are heated to form a homogenous alloy melt. (Step 210) As in conventional rapid solidification procedures, the melted alloy is then solidified. (Step 220) Conventionally, the material is rapidly solidified by depositing the melt onto a cooling surface at a fairly slow mass flow rate (e.g., by directing the material onto the surface through a funnel having an orifice not more than about 1 mm orifice in diameter) so that it cools at a rate of not less than about $10^6$ degrees Celsius per second. In the practice of the present invention, the melt is cooled at a much slower rate than in conventional rapid solidification, i.e., at a rate slower than about $10^5$ degrees Celsius per second and preferably faster than about $10^4$ degrees Celsius per second. This slower solidification rate can be achieved using a number of solidification procedures. For example, it is conventional to rapidly cool a liquid homogeneous melt using rotating cup or other forms of gas atomization. The parameters that control the cooling rate in these atomization procedures are understood by those skilled in the art and, in the practice of the present invention, these procedures can readily be modified so that the atomized particles from the liquid homogeneous melt cool at a rate in the about $10^4$ to about $10^5$ degrees Celsius per second range discussed above, rather than at the faster conventional rapid quench rate.

In the preferred practice of the present invention, the relatively slower cooling rate is achieved by controlling the chamber pressure to be at near atmospheric pressure, which is preferably in the range of about 10 kPa to about 100 kPa, and adjusting the mass flow rate at which the liquid melt impinges onto the wheel or other cooling surface. Typically, a much greater mass flow rate (greater than about 1 kg per minute, e.g., about 4 kg per minute) as compared to the less than 0.5 kg per minute mass flow rate typical in conventional rapid solidification procedures, is achieved by directing the molten material from the melt onto the cooling surface through a larger orifice that is much larger, e.g., is about 3 mm in diameter, and thus has a cross-sectional area about an order of magnitude larger, than that used in conventional rapid solidification. At these chamber pressures, largely because of the greater mass flow rate, the melt cools at a much slower rate than when rapidly quenched, and solidifies to form a layer that is significantly thicker (e.g., between about 120 and 200 microns, and preferably about 120 to 150 microns, thick) than the ribbon (typically 25–35 microns thick) produced during conventional rapid solidification. In this respect, it will be recognized that the thickness of the deposited layer is directly related to the cooling rate (i.e., the faster the cooling rate the thinner the layer), and that those skilled in the field are able quite accurately estimate the cooling rate on the basis of the deposited thickness. At lower chamber pressures, the melt is more thermally isolated and so cools at an even slower rate which is generally too slow to control in manufacturing situations.

The thus produced layer is then crushed to form a fine powder (Step 230); however, it will be recognized that this step may be omitted when the solidification process itself, e.g., an atomization procedure, produces a sufficiently fine powder. However produced directly or by crushing, the powder is heat-treated in a rotary kiln in the usual manner (Step 240), e.g., at a temperature in the range of about 600 to about 750, and preferably about 680, degrees Celsius. After heat treating, the powder has a coercivity of more than 1000 Oersteds. Optionally, the powder is magnetically separated (Step 240) before forming into a permanent magnet (Step 250).

Powders having the compositions discussed above and produced using the procedure of the present invention have been found to have coercivity and other magnetic properties equal or superior to those of powders having the same composition made according to conventional two-step, rapid quenching processes. However, it has also been found that both the cooling rate and the composition of the material are important; powders having compositions outside of the range discussed above, e.g., powders made by a relatively slow-cooling process have properties that are significantly poorer than powders of the same composition made according to conventional two-step, rapid quenching processes if the boron content of the material is too low, i.e., is less than about ten atomic percent, or rare earths other than Nd or Pr constitute more than about ten atomic percent of the total rare earth content.

This is illustrated by the following Table that compares a magnetic material of the present invention to four other magnetic materials. The initial entries in the Table identify the composition of the various materials. The composition of the material of the present invention (Example 5) and those of Examples 3 and 4 are approximately the same; and the composition of the material of Example 1 has about the same B, TM and overall RE content. The compositions of all four of these materials are substantially that identified as point I on FIG. 1. Similarly, the somewhat different composition of the material of Example 2 is identified as point II on FIG. 1. Other entries in the Table refer to variations in the processing procedure: e.g., "Orifice" is the diameter, in mm, of the orifice through which the melt flows onto the cooling surface; "Thickness" and "Width" are the width and thickness of the ribbon or layer formed on the cooling surface; "Mass Flow" is the rate at which the melt flows onto the cooling surface; and "Wheel Speed" is the speed of the circumference of the circular cooling surface. In all of the examples, the materials were subjected to the same "Heat Treatment", i.e., 680 degrees C. in a rotating kiln. "BHmax", "Br" and "Hci" are magnetic properties of the powder produced from the various materials.

| Composition (at %) | Example 1 | Example 2 | Example 3 | Example 4 | Present Invention |
|---|---|---|---|---|---|
| Nd | 3.8 | 8.5 | 3.98 | 4.05 | 4.0 |
| La | 0.56 | — | — | — | — |
| B | 18.7 | 10.5 | 18.38 | 19.02 | 19.0 |
| Fe | Balance | Balance | Balance | Balance | Balance |
| Orifice (mm) | 3 | 3 | 3 | 1 | 3 |
| Thickness (microns) | 150 | 120 | 200–300 | 30 | 120 |

-continued

| Composition (at %) | Example 1 | Example 2 | Example 3 | Example 4 | Present Invention 5 |
|---|---|---|---|---|---|
| Width (mm) | 8–12 | 8–12 | 6–10 | 2–3 | 8–12 |
| Mass flow (kg/min) | 6.4–9.6 | 5.1–7.7 | 6.4–16.0 | 0.7–1.0 | 5.1–7.7 |
| Chamber Pressure (kPa) | 50 to 100 | 50 to 100 | 50 to 100 | 20 to 100 | 50 to 100 |
| Wheel Speed (in/sec) | 12 | 12 | 12 | 25 | 12 |
| Heat treatment (C.) | 680 | 680 | 680 | 680 | 680 |
| BH max (MGOe) | <8 | <5 | <8 | 11 | 13 |
| Br (kG) | <9 | <7 | 9 | 10 | 11 |
| Hci (kOe) | <2 | <6 | 1.2 | 2.6 | 3.4 |

The material of Example 4 was produced using conventional procedures, i.e., a master alloy was formed in a first step, and the alloyed material was then rapidly solidified in the conventional manner in a second step. All of the other materials, i.e., those of Examples 1 through 3 and 5, were produced by depositing the melted material onto a cooling surface not far below atmospheric pressure in such a way that it cooled more slowly, i.e., at a rate slower than about $10^5$ degrees Celsius per second but more than about $10^4$ degrees Celsius per second, and formed a thicker layer, than in conventional rapid quenching.

From the Table, it will be noted that materials having compositions of about 4 atomic percent Nd, about 18–19 atomic percent Boron, and balance FE, had good properties when produced using conventional rapid solidification techniques (Example 4), and had significantly better magnetic properties when produced using the procedure of the present invention (Example 5). However, a material of substantially the same composition (Example 3) had unsatisfactory properties if the melted material was cooled too slowly, e.g., when deposited on the cooling surface in such a way that the too-slow cooling rate resulted in a deposited layer more than 200–300 microns thick (Example 3).

It will similarly be noted from the Table, that, even when produced using a procedure in which the material was cooled at the rate (more than $10^4$ but less than $10^5$ degrees Celsius per second) desired in the practice of the present invention, powder materials that included too little boron (e.g., Example 2) or which had about the same overall B, RE and TM content as materials of the present invention but in which lanthanum was more than 10 percent of the total rare earth content (e.g., Example 1), were unsatisfactory.

It will be appreciated that the particular examples shown in the Table are exemplary only and do not limit the scope of the present invention. Rather, the present invention, and its advantages, encompass materials of other compositions within the scope of the claims when produced using the claimed procedures. Thus, other embodiments of the invention will be within the scope of the following claims.

What is claimed is:

1. The method of producing a magnetic material having a coercivity greater than 1000 Oersted comprising the steps of:
   providing a molten mixture including boron, one or more rare earths and one or more transition metals; and
   cooling said mixture at a rate slower than about $10^5$ degrees Celsius per second at a pressure of about 100 kPa, the molten mixture containing not less than about ten atomic percent boron, not less than about 60 atomic percent transition metals, and not more than about 10 atomic percent rare earths,
   wherein at least about 90 percent by weight of said rare earths comprise Nd, Pr, or a mixture thereof.

2. The method of claim 1 wherein the rate at which said mixture is cooled is faster than about $10^4$ degrees Celsius per second.

3. The method of claim 1 wherein said molten mixture is cooled by impinging said molten mixture on a heat conducting surface so that said mixture forms a layer having a thickness between about 120 and about 300 microns.

4. The method of claim 3 wherein the thickness of said layer is between about 120 and about 150 microns.

5. The method of claim 1 wherein said mixture includes between about 10 and about 30 atomic percent boron.

6. The method of claim 5 wherein said mixture includes between about 15 and about 20 atomic percent boron.

7. The method of claim 1 including the steps of heat treating a powder of said mixture, and thereafter producing a permanent magnet including said powder.

8. The method of claim 7 including the step of cooling said mixture to form a layer thereof and thereafter crushing said layer into said powder.

9. The method of claim 7 including the step of magnetically separating said powder prior to producing said magnet.

10. The method of claim 1 wherein said mixture includes between about 3 and about 10 atomic percent rare earth.

11. The method of claim 1 wherein said molten mixture includes at least 60 atomic percent of one or more transition metals.

12. The method of claim 1 wherein said molten mixture includes at least 70 atomic percent of one or more transition metals.

13. The method of claim 1 wherein said transition materials are selected from the group consisting of titanium, vanadium, zirconium, niobium, hafnium, chromium, nickel and iron.

14. The method of claim 1 wherein the major component by weight of said transition metals is Fe.

15. The method of claim 1 wherein the composition of said molten mixture is within the bounds of the parallelepiped whose corners are defined by points A, B, C and D of FIG. 1.

16. The method of claim 15 wherein the composition of said molten mixture is within the bounds of the trapezoid whose corners are defined by points E, F, G and H of FIG. 1.

17. The method of producing a magnetic material having a coercivity greater than 1000 Oersted comprising the steps of:
   providing a molten mixture including boron, one or more rare earths and one or more transition metals, the molten mixture having not less than about ten atomic percent boron; and
   cooling said mixture by impinging said molten mixture on a heat conducting surface such that said mixture solidifies to form a layer having a thickness between about 120 and about 300 microns,
   said mixture being cooled at a rate slower than about $10^5$ degrees Celsius per second at a pressure of about 100 kPa.

18. The method of claim 17 wherein said mixture is solidified to form a layer having a thickness between about 120 and about 150 microns.

19. The method of claim 17 wherein the composition of said molten mixture is within the bounds of the parallelepiped whose corners are defined by points A, B, C and D of FIG. 1.

20. The method of claim 18 wherein the composition of said molten mixture is within the bounds of the trapezoid whose corners are defined by points E, F, G and H of FIG. 1.

21. The method of claim 18 wherein not more than 10 percent by weight of said rare earths comprise a rare earth other than Nd or Pr.

22. The method of claim 18 wherein transition materials are selected from the group consisting of titanium, vanadium, zirconium, niobium, hafnium, chromium, nickel and iron.

23. The method of claim 17 including the steps of producing a powder from said layer, heat treating said powder, and thereafter producing a permanent magnet including said powder.

24. The method of producing a magnetic material having a coercivity greater than 1000 Oersted comprising the steps of:
providing a molten mixture including about 10 to about 30 atomic percent boron, about 3 to about 10 atomic percent one or more rare earths and not less than about 60 atomic percent one or more transition metals; and
cooling said mixture at a rate slower than about $10^5$ degrees Celsius per second at a pressure of about 100 kPa by impinging said molten mixture on a heat conducting surface such that said mixture solidifies to form a layer having a thickness between about 120 and about 300 microns.

25. The method of claim 24 wherein said mixture is cooled at a rate faster than about $10^4$ degrees Celsius per second.

26. The method of claim 24 wherein said mixture is solidified to form a layer having a thickness between about 120 and about 150 microns.

27. The method of claim 24 wherein the composition of said molten mixture is within the bounds of the parallelepiped whose corners are defined by points A, B, C and D of FIG. 1.

28. The method of claim 24 wherein the composition of said molten mixture is within the bounds of the trapezoid whose corners are defined by points E, F, G and H of FIG. 1.

29. The method of claim 24 wherein not more than 10 percent by weight of said rare earths comprise a rare earth other than Nd or Pr.

30. The method of claim 24 wherein said transition metals are selected from the group consisting of titanium, vanadium, zirconium, niobium, hafnium, chromium, nickel and iron, and the major fraction by weight of said transition metals is iron.

31. The method of producing a magnetic material having a coercivity greater than 1000 Oersted comprising the steps of:
providing a molten mixture including boron, one or more rare earths and one or more transition metals, the molten mixture containing not less than about ten atomic percent boron, not less than about 60 atomic percent transition metals, and not more than about 10 atomic percent rare earths, wherein at least about 90 percent by weight of said rare earths comprise Nd, Pr, or a mixture thereof;
cooling said mixture at a rate slower than about $10^5$ degrees Celsius per second at a pressure of about 100 kPa; and
heat treating a powder of said mixture.

32. The method of claim 31 wherein the rate at which said mixture is cooled is faster than about $10^4$ degrees Celsius per second.

33. The method of claim 31 wherein said molten mixture is cooled by impinging said molten mixture on a heat conducting surface so that said mixture forms a layer having a thickness between about 120 and about 300 microns.

34. The method of claim 33 wherein the thickness of said layer is between about 120 and about 150 microns.

35. The method of claim 31 wherein said mixture includes between about 10 and about 30 atomic percent boron.

36. The method of claim 35 wherein said mixture includes between about 15 and about 20 atomic percent boron.

37. The method of claim 31 further comprising producing a permanent magnet including said powder.

38. The method of claim 31 including the step of cooling said mixture to form a layer thereof and thereafter crushing said layer into said powder.

39. The method of claim 38 including the step of magnetically separating said powder prior to producing said magnet.

40. The method of claim 31 wherein said mixture includes between about 3 and about 10 atomic percent rare earth.

41. The method of claim 31 wherein said molten mixture includes at least 60 atomic percent of one or more transition metals.

42. The method of claim 31 wherein said molten mixture includes at least 70 atomic percent of one or more transition metals.

43. The method of claim 31 wherein said transition materials are selected from the group consisting of titanium, vanadium, zirconium, niobium, hafnium, chromium, nickel and iron.

44. The method of claim 31 wherein the major component by weight of said transition metals is Fe.

45. The method of claim 44 wherein the composition of said molten mixture is within the bounds of the trapezoid whose corners are defined by points E, F, G and H of FIG. 1.

46. The method of claim 31 wherein the composition of said molten mixture is within the bounds of the parallelepiped whose corners are defined by points A, B, C and D of FIG. 1.

47. The method of producing a magnetic material having a coercivity greater than 1000 Oersted comprising the steps of:
providing a molten mixture including about 10 to about 30 atomic percent boron, about 3 to about 10 atomic percent one or more rare earths and not less than about 60 atomic percent one or more transition metals;
cooling said mixture at a rate slower than about $10^5$ degrees Celsius per second by impinging said molten mixture on a heat conducting surface at a pressure of about 100 kPa such that said mixture solidifies to form a layer having a thickness between about 120 and about 300 microns; and
producing a powder from said layer, and heat treating said powder.

48. The method of claim 47 wherein said mixture is cooled at a rate faster than about $10^4$ degrees Celsius per second.

49. The method of claim 47 wherein said mixture is solidified to form a layer having a thickness between about 120 and about 150 microns.

50. The method of claim 47 wherein the composition of said molten mixture is within the bounds of the parallelepiped whose corners are defined by points A, B, C and D of FIG. 1.

51. The method of claim 47 wherein the composition of said molten mixture is within the bounds of the trapezoid whose corners are defined by points E, F, G and H of FIG. 1.

52. The method of claim 47 wherein not more than about 10 percent by weight of said rare earths comprise a rare earth other than Nd or Pr.

53. The method of claim 47 wherein said transition metals are selected from the group consisting of titanium, vanadium, zirconium, niobium, hafnium, chromium, nickel and iron, and the major fraction by weight of said transition metals is iron.

54. The method of claim 17 wherein said mixture is cooled at a rate faster than about $10^4$ degrees Celsius per second.

55. The method of producing a magnetic material comprising the steps of:

directing a molten mixture through an orifice at a rate greater than about 4 kg per minute, said molten mixture including boron, one or more rare earths and one or more transition metals; and cooling said mixture at a rate slower than about $10^5$ degrees Celsius per second, the molten mixture containing not less than about ten atomic percent boron, not less than about 60 atomic percent transition metals, and not more than about 10 atomic percent rare earths, wherein at least about 90 percent by weight of said rare earths comprise Nd, Pr, or a mixture thereof.

56. The method of claim 55 wherein said molten mixture is cooled at a pressure of about 100 kPa.

57. The method of claim 55 wherein the rate at which said mixture is cooled is faster than about $10^4$ degrees Celsius per second.

58. The method of claim 55 wherein said molten mixture is cooled by impinging said molten mixture on a heat conducting surface so that said mixture forms a layer having a thickness between about 120 and about 300 microns.

59. The method of claim 58 wherein the thickness of said layer is between about 120 and about 150 microns.

60. The method of claim 55 wherein said mixture includes between about 10 and about 30 atomic percent boron.

61. The method of claim 60 wherein said mixture includes between about 15 and about 20 atomic percent boron.

62. The method of claim 55 including the steps of heat treating a powder of said mixture, and thereafter producing a permanent magnet including said powder.

63. The method of claim 62 including the step of cooling said mixture to form a layer thereof and thereafter crushing said layer into said powder.

64. The method of claim 62 including the step of magnetically separating said powder prior to producing said magnet.

65. The method of claim 55 wherein said mixture includes between about 3 and about 10 atomic percent rare earth.

66. The method of claim 55 wherein said molten mixture includes at least 60 atomic percent of one or more transition metals.

67. The method of claim 55 wherein said molten mixture includes at least 70 atomic percent of one or more transition metals.

68. The method of claim 55 wherein said transition materials are selected from the group consisting of titanium, vanadium, zirconium, niobium, hafnium, chromium, nickel and iron.

69. The method of claim 55 wherein the major component by weight of said transition metals is Fe.

70. The method of claim 55 wherein the composition of said molten mixture is within the bounds of the parallelepiped whose corners are defined by points A, B, C and D of FIG. 1.

71. The method of claim 70 wherein the composition of said molten mixture is within the bounds of the trapezoid whose corners are defined by points E, F, G and H of FIG. 1.

72. The method of claim 55 wherein said orifice has a diameter greater than about 1.5 mm.

73. The method of claim 72 wherein said diameter is about 3 mm.

* * * * *